UNITED STATES PATENT OFFICE.

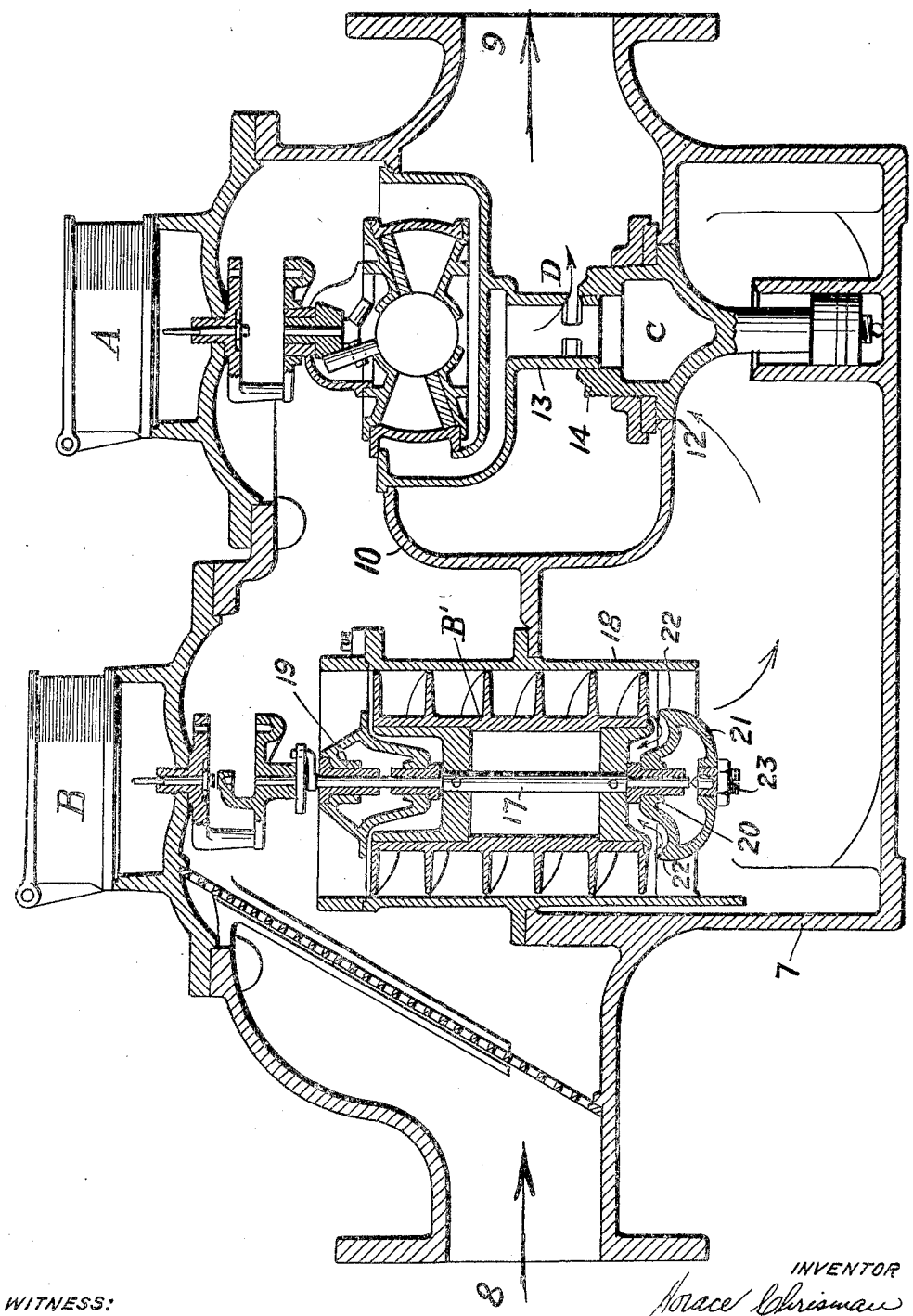

HORACE CHRISMAN, OF EDGEWOOD PARK, PENNSYLVANIA, ASSIGNOR TO PITTSBURGH METER COMPANY, OF EAST PITTSBURGH, PENNSYLVANIA, A CORPORATION OF PENNSYLVANIA.

FLUID-METER.

1,400,523.      Specification of Letters Patent.      Patented Dec. 20, 1921.

Original application filed November 17, 1916, Serial No. 133,577. Divided and this application filed December 20, 1917. Serial No. 208,004.

*To all whom it may concern:*

Be it known that I, HORACE CHRISMAN, a citizen of the United States, residing at Edgewood Park, county of Allegheny, and State of Pennsylvania, have invented certain new and useful Improvements in Fluid-Meters, of which the following is a specification.

This invention relates to fluid meters and is a division of my co-pending application, Serial Number 133,577, filed November 27, 1916. One of the primary objects of the invention resides in the provision of a simple, compact and efficient operating mechanism or motor for the meter, and more particularly in the provision of means whereby the motor is substantially balanced to diminish the friction on the bearings and increase the sensitiveness and response of the motor to the fluid passing through the metering device.

The foregoing, together with such other objects as may hereinafter appear, or are incident to my invention, I obtain by means of a construction, a preferred embodiment of which I have illustrated in the accompanying drawings wherein the figure is a longitudinal section through a standard form of compound water meter in which my invention is embodied.

The general construction and operation of such meters is well understood, and it will suffice to point out that the meter casing 7 which contains the meters A and B is divided into two chambers by means of the wall 10, 8 being the induction or inlet end and 9 the eduction or outlet end of the casing. Communication between the two compartments into which the interior of the casing is divided by the wall 10 is had by means of the opening or orifice 12 which is controlled by a valve C. The valve C is provided with a sleeve 14 adapted to slidably fit on the tubular portion or stem 13 of the operating mechanism of meter A, such tubular portion being provided with outlet ports or passages D which are uncovered when the valve C is seated and covered when the valve C is opened.

The water motor or operating mechanism for the meter B comprises a rotary propeller mechanism B' mounted on a shaft 17, which shaft is supported in bearings in the sleeve 18, which in turn is supported in the wall 10. The details of the construction of the operating motor B' will be hereinafter more specifically pointed out.

In general the operation of the whole meter is as follows: when the draft on the system is light and the flow through the main small, the valve C is held to a firm seat and the small flows that take place pass from the induction to the eduction side of the casing directly through the meter A, tubular stem 13, and ports D, the flows being registered by the meter. When there is a heavy or abnormal draft on the system, the valve C opens because of reduction of pressure on the eduction side of the casing, and the flow through the meter A is stopped by sleeve 14 of valve C covering the ports D. The flow now takes place from the induction to the eduction side through the propeller mechanism B' and the main orifice 12, such flow being registered by the meter B. The registration of the meters A and B when added together represents the total amount of water passed through the meter.

The point at which the meter A ceases to register and the meter B begins to register, and vice versa, is termed the "cross-over" and heretofore in compound water meters of the general type described, the registration has been inaccurate either because both meters were registering at or near the point of cross-over, or because there was an interval or gap between the time meter A ceased to register and meter B began to register, and vice versa. Furthermore, in meters of this class, inaccurate registration results from the fact that the flow at the time of the cross-over is usually too small in volume to operate the propeller B', as a result of which the registration will be slow, that is to say, more water will pass through the meter than is registered. Stated in other words, in the general types of compound meters of this character the water motor mechanism B' is not sufficiently sensitive to properly respond at the instant of cross-over, and lags. This difficulty may be partly overcome by making the mechanism associated with the meter A more sensitive in its response, as is pointed out and claimed in the aforesaid co-pending application. The difficulty may also be overcome by arranging the motor B' so as to more sensitively respond, to which feature this application is particularly directed.

As hereinbefore indicated, the shaft 17 is supported in the sleeve 18 in bearings. The top bearing 19 for the shaft is carried on the sleeve 18, and the bottom bearing 20 is carried in the bearing block or housing 21 at the bottom of the sleeve 18. This housing 21 is preferably formed integrally with the sleeve 18 and in general is in the form of a spider, with an imperforate central portion. The shaft also has a thrust bearing on the stud 23. The central portion of the housing 21 is provided with an annular lip 22 and the upper surface of the central portion is curved upwardly and arranged so as to direct a portion of the water running downwardly through the propeller upwardly against the bottom of the propeller, as shown by the arrows. By the arrangement the propeller mechanism is subject to opposite pressures which are more or less equalized, as a result of which both the bearing 20 and the stud 23 are relieved of the greatest part, if not all, of the downward thrust. The propeller is thus substantially balanced, and its response to flows is very sensitive by virtue of the reduction in friction. At the instant, therefore, the valve C opens and water begins to flow through the sleeve 18, the propeller B' will begin to rotate and the meter B will register the flow. In order to increase the efficiency of the propeller, the lip 22 terminates in a sharp edge and the upper surface of the central portion of the housing is given a reverse curve so that the downwardly flowing water may be upwardly directed with a minimum drop in pressure from friction losses.

I claim:

A metering device comprising in combination a casing through which the fluid to be measured flows, means in the casing for operating the meter, said means being actuated by the flow of fluid through said casing, a bearing for said means, and means coöperating with the operating means and spaced away therefrom to entrap a relatively stagnant body of fluid therebetween subject to the impact of the fluid flowing through the casing, the space being so formed as to translate the impact pressure into a pressure against the operating means in a direction opposite to the flow of fluid which acts to relieve the pressure on the bearing.

In testimony whereof I have hereunto signed my name.

HORACE CHRISMAN.